(No Model.)

F. CORBETT.
ANTI FRICTION HAND IRONING MACHINE.

No. 356,240. Patented Jan. 18, 1887.

WITNESSES:
Chas. Niera
C. Sedgwick

INVENTOR:
F. Corbett
BY Munn & Co.
ATTORNEYS.

United States Patent Office.

FRANK CORBETT, OF NEW YORK, N. Y.

ANTI-FRICTION HAND IRONING-MACHINE.

SPECIFICATION forming part of Letters Patent No. 356,240, dated January 18, 1887.

Application filed April 27, 1886. Serial No. 200,294. (No model.)

*To all whom it may concern:*

Be it known that I, FRANK CORBETT, of the city, county, and State of New York, have invented a new and useful Improvement in Anti-Friction Hand Ironing-Machines, of which the following is a full, clear, and exact description.

Reference is to be had to the accompanying drawings, forming a part of this specification, in which similar letters of reference indicate corresponding parts in all the figures.

Figure 1:
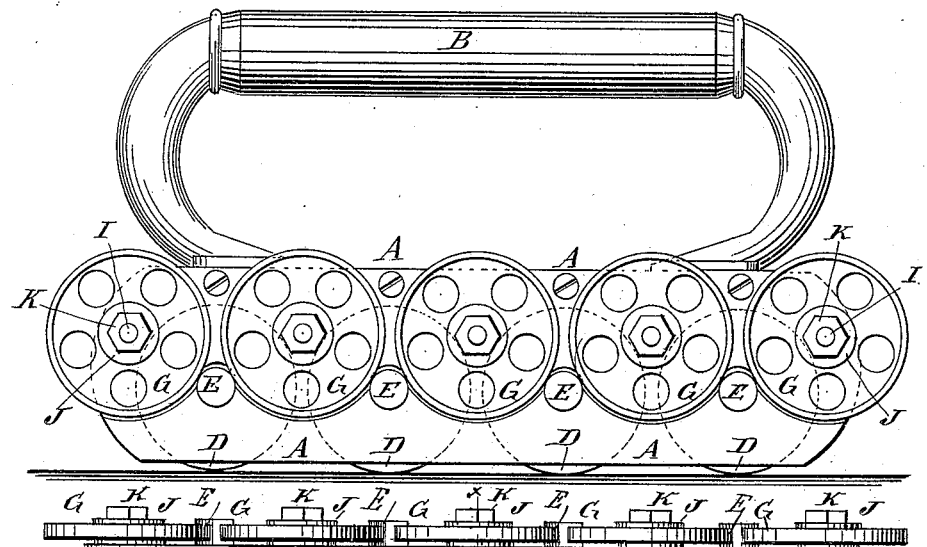
Figure 2:
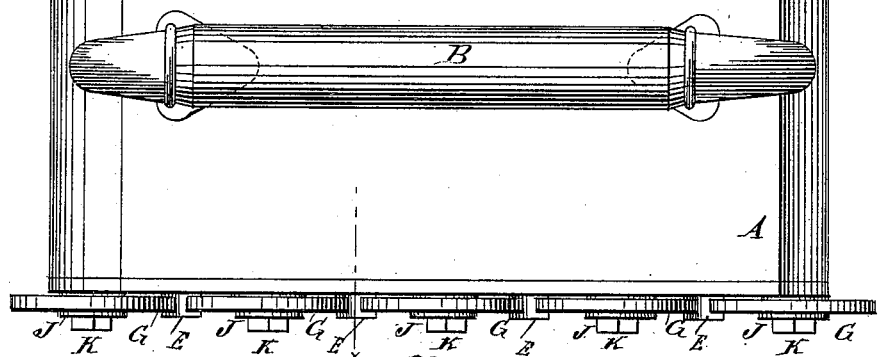
Figure 3:
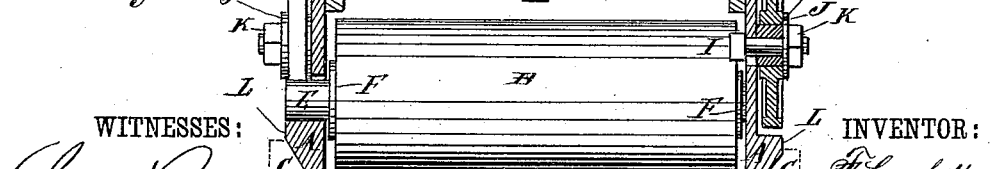

Figure 1 is a side elevation of my improved anti-friction hand ironing-machine. Fig. 2 is a plan view of the same. Fig. 3 is a sectional end elevation of the same, taken through the broken line $x\ x$, Fig. 2, the handle being broken away.

The object of this invention is to provide anti-friction hand ironing-machines constructed in such a manner as to lessen the friction and wear, so that the machines will be more easily operated, and more durable than when constructed in the usual manner.

The invention consists in the construction and combination of various parts of the machine, as will be hereinafter fully described.

A represents a casing, which can be made in one piece, or in several pieces secured to each other. The sides of the casing A are vertical, and its ends are rounded, as shown in Fig. 1. To the top of the casing A are secured by screws or rivets the ends of the handle B. The lower edges of the sides of the casing A are beveled to fit into the beveled edge of the frame or stand C, upon which the machine is placed when being heated, as indicated in dotted lines in Fig. 3.

D are rollers, four (more or less) of which may be used, and which have journals E formed upon or attached to their ends, and are provided with slightly-projecting circular shoulders F around the said journals, to prevent the outer parts of the ends of the said rollers from coming in contact with the inner surfaces of the sides of the casing A. The journals E revolve in bearings in the sides of the casing A in such positions that the rollers D will be out of contact with each other and with the top of the said casing A, and will project a little below the lower edge of the said casing, as shown in Fig. 1. The journals E project beyond the outer surfaces of the sides of the casing A, and upon the side parts of their upper sides rest the faces of small wheels G. The hubs of the wheels G revolve upon tubular journals H, placed upon bolts I, which pass through holes in the sides of the casing A, and have washers J and nuts K upon their outer ends. The tubular journals H are made a little longer than the hubs of the wheels G, so that when the nuts K are screwed up the said tubular journals will be clamped between the washers J and the sides of the casing A, while the said wheels G can revolve freely. The holes in the sides of the casing A that receive the bolts I are elongated slightly downward, so that the said bolts can be adjusted to take up the wear when required.

The lower parts of the sides of the casing A can be thickened to form shoulders L below the wheels G, as shown in Fig. 3, to prevent the clothes from coming in contact with the said wheels and being soiled thereby.

The bearings for the journals E are slightly elongated upward, to give the said journals a slight upward play and allow the wheels G to receive the entire upward pressure of the rollers D.

Having thus fully described my invention, I claim as new and desire to secure by Letters Patent—

1. In a hand ironing-machine, the combination, with the casing A and the rollers D, journaled in the casing, and having their journals E projecting from the sides thereof, of the friction-wheels G, pivoted to the sides of the casing and bearing upon the journals of the said rollers, substantially as herein shown and described.

2. In a hand ironing-machine, the combination, with the slotted casing A, the rollers D, and the anti-friction wheels G, of the tubular journals H and the bolts I, washers J, and nuts K, substantially as herein shown and described, whereby the said wheels can be readily adjusted to take up the wear, as set forth.

FRANK CORBETT.

Witnesses:
JAMES T. GRAHAM,
C. SEDGWICK.